US005448316A

United States Patent [19]

Bongenaar et al.

[11] Patent Number: 5,448,316

[45] Date of Patent: Sep. 5, 1995

[54] ASSEMBLY OF ANTI-IMPLOSION BANDS, ANTI-IMPLOSION BAND FOR SUCH AN ASSEMBLY AND DISPLAY TUBE COMPRISING SUCH AN ANTI-IMPLOSION BAND

[75] Inventors: Hendrik Bongenaar; Franciscus A. J. Hessels, both of Eindhoven, Netherlands

[73] Assignee: U.S. Philips Corporation, New York, N.Y.

[21] Appl. No.: 590,397

[22] Filed: Sep. 28, 1990

[30] Foreign Application Priority Data

Oct. 2, 1989 [NL] Netherlands .......................... 8902437
Nov. 10, 1989 [NL] Netherlands .......................... 8902784

[51] Int. Cl.$^6$ .............................................. H04N 5/65
[52] U.S. Cl. ...................................... 348/821; 348/822
[58] Field of Search ................ 358/248, 246; 348/821, 348/822, 824; 313/482

[56] References Cited

U.S. PATENT DOCUMENTS

| | | | |
|---|---|---|---|
| 3,626,093 | 9/1971 | Inglis | 358/246 |
| 4,031,553 | 6/1977 | Sumiyoshi et al. | 358/246 |
| 4,155,102 | 5/1979 | Bongehaar | 358/248 |
| 4,641,196 | 2/1987 | Musha et al. | 358/246 |
| 4,668,993 | 5/1987 | Hermann | 358/246 |

FOREIGN PATENT DOCUMENTS

| | | | |
|---|---|---|---|
| 62-58553 | 3/1987 | Japan | 313/482 |

*Primary Examiner*—Scott A. Rogers
*Assistant Examiner*—Thomas L. Stoll
*Attorney, Agent, or Firm*—Paul R. Miller

[57] ABSTRACT

An assembly of at least two stacked anti-implosion bands, in which each anti-implosion band 14, 24 comprises suspension elements 15, 25 projecting from the anti-implosion band 14, 24 which surround the adjacent anti-implosion band with clearance. As a result, anti-implosion bands can be stacked in a simple manner for storage and/or shipment, and can be readily unstacked for individual attachment to display tubes.

24 Claims, 2 Drawing Sheets

ASSEMBLY OF ANTI-IMPLOSION BANDS, ANTI-IMPLOSION BAND FOR SUCH AN ASSEMBLY AND DISPLAY TUBE COMPRISING SUCH AN ANTI-IMPLOSION BAND

BACKGROUND OF THE INVENTION

The invention relates to an assembly of at least two detachably superposed annular anti-implosion bands.

The invention also relates to an anti-implosion band for such an assembly.

The invention further relates to a display tube comprising such an anti-implosion band.

A display tube, which generally comprises an evacuated envelope having a substantially rectangular display window, can be used in black and white, colour and projection television, as well as in the display of digits and letters (Data Graphic Display) and in other apparatus in which a display tube is used.

To preclude implosion of the display tube, the envelope is customarily provided with an anti-implosion band. In particular, annular metal bands called shrink bands are used for this purpose, which are provided around the display window in a heated state and, after cooling, secure the display window under a mechanical stress.

In general, the anti-implosion bands are manufactured separately from the envelopes in large numbers, and have to be stored and/or transported before they can be provided around the envelopes. In practice however, it appears that storing and/or transporting anti-implosion bands can sometimes lead to deformation of the bands.

Deformation of an anti-implosion band is undesirable because it may give rise to problems when securing the anti-implosion band around the display tube and, in some cases, it may even lead to fracture of the envelope during the cooling of the anti-implosion band.

OBJECTS AND SUMMARY OF THE INVENTION

It is an object of the invention to at least largely preclude the deformation of the anti-implosion bands during storage and transport.

A further object of the invention is to provide an implosion-protected display tube.

According to the invention, these objects are achieved by constructing each of the anti-implosion bands so that suspension elements secured to the outer surfaces of the bands project from one edge of the anti-implosion band in a direction parallel to the central axis of the band, whereby in a stacked assembly at least a part of the outer surface of at least one of the anti-implosion bands is loosely surrounded by the projecting parts of the suspension elements of the other anti-implosion band.

Since the known anti-implosion bands do not have projecting suspension elements, a stacked assembly of these said bands can move relative to each other and may sometimes even be in a nested engagement, which can cause deformation of the anti-implosion bands. In addition, detaching the bands is labour-intensive and may lead to further deformations.

By virtue of the fact that the suspension elements of the one anti-implosion band of the assembly according to the invention partly loosely surround the outer surface of the adjacent anti-implosion band, it is possible, on the one hand, to stack the anti-implosion bands in a simple manner without the bands being in a nested engagement and, on the other hand, to limit the displacement relative to each other in a direction transverse to the central axis of the assembly. As a result, the assembly remains stable during transport, and deformations of the anti-implosion bands are at least largely precluded.

A preferred embodiment of an assembly according to the invention is characterized in that the width of the contact surface between the adjacent edges of the superposed anti-implosion bands is at least equal to half the thickness of an anti-implosion band. By virtue of this construction, an assembly of at least two anti-implosion bands is found to be stable.

In order to ensure that the movement of the anti-implosion bands relative to each other is limited, preferably, the distance over which the suspension element projects from the edge of the anti-implosion band is at least 20% of the width of the anti-implosion band.

Moreover, taking the assembly apart does not require much force because the anti-implosion bands are not stacked in a nested manner.

An anti-implosion band for an assembly according to the invention permits stacking and unstacking to be carried out in a simple operation which can be mechanized and offers a satisfactory implosion-protection to the display tube.

In certain types of display tubes the anti-implosion band is provided with a coating to preclude undesirable light reflections from the anti-implosion band. To ensure that this coating is not damaged during the stacking and transport of the anti-implosion bands, a preferred embodiment of an anti-implosion band according to the invention is characterized in that the suspension elements are L-shaped and the width of the anti-implosion band is smaller than the length of the part of each suspension element which extends substantially transversely to the annular surface of the anti-implosion band.

In practice, the L-shaped suspension elements can be secured to the outer surface in a simple manner, for example, by welding a part of the suspension element to the outer surface. The part which extends transversely to the part secured to the outer surface, herein called the ear, can be used to suspend the display tube in a cabinet.

By selecting the width of the anti-implosion band to be smaller than the part of the suspension element which extends transversely to the annular surface, it is precluded that during the stacking of two anti-implosion bands to form an assembly, two anti-implosion bands lie against each other in an undesirable manner, as a result of which damage to a coating applied to the bands is limited to a sufficient degree.

Another preferred embodiment of an anti-implosion band according to the invention is characterized in that the suspension elements are secured to the corners of the anti-implosion band in a manner to limit the directions of movement of the anti-implosion bands, for example, rotation relative to each other in an undesirable manner.

A display tube comprising an anti-implosion band according to the invention exhibits a satisfactory implosion safety.

BRIEF DESCRIPTION OF THE DRAWING

These and other aspects of the invention will be described and explained by means of exemplary embodiments and with reference to the accompanying drawing, in which.

DESCRIPTION OF PREFERRED EMBODIMENTS

Figure 1:
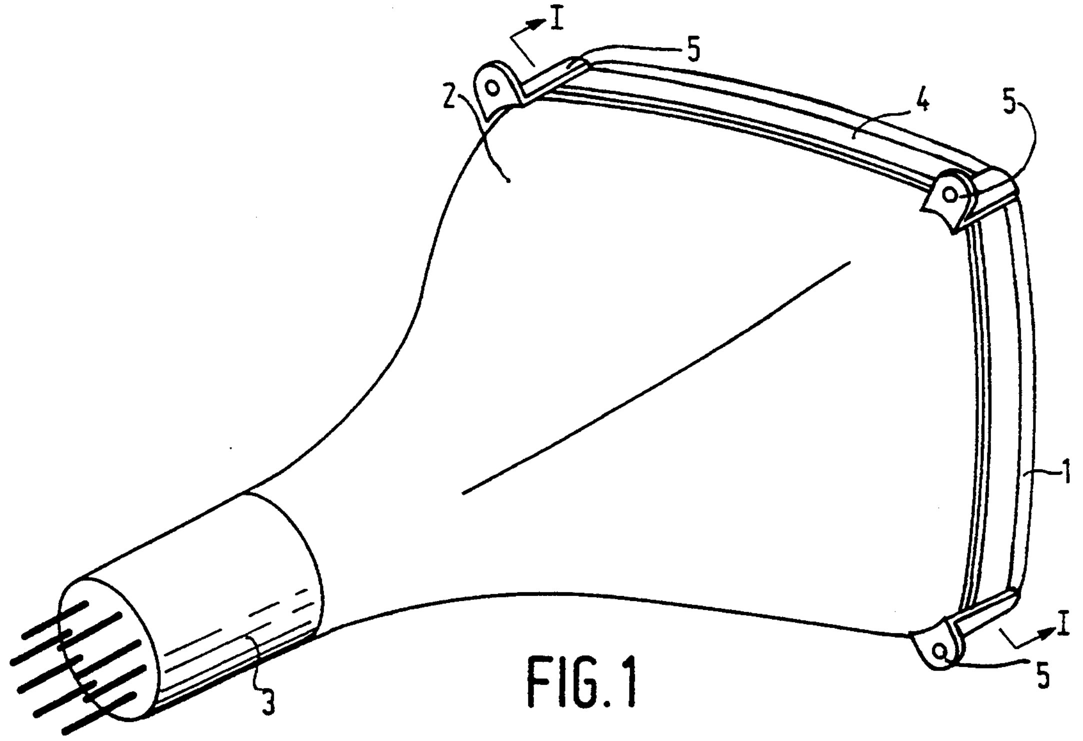
FIG. 1 is a diagrammatic perspective view of a display tube according to the invention.
Figure 3:
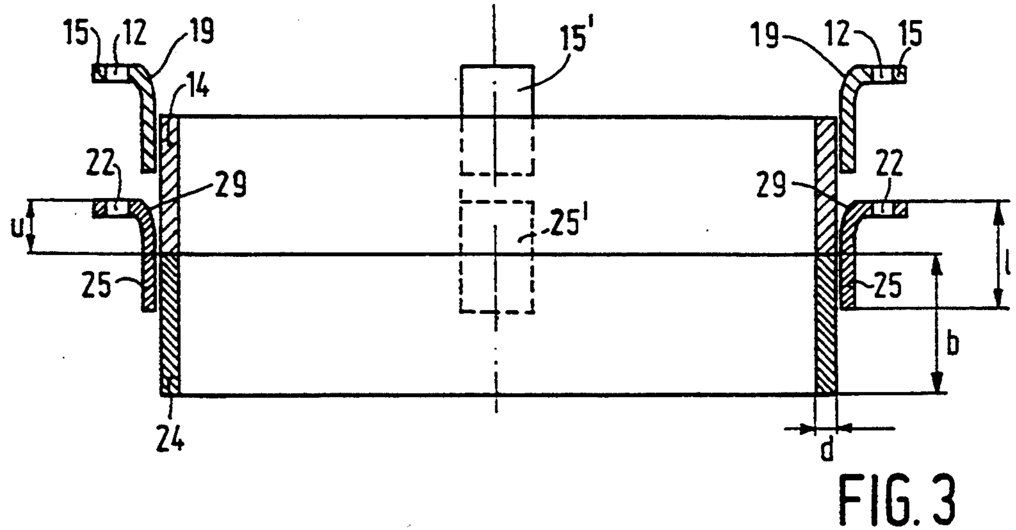
FIG. 3 is a diagrammatic sectional view of a second embodiment of an assembly according to the invention.
Figure 4:
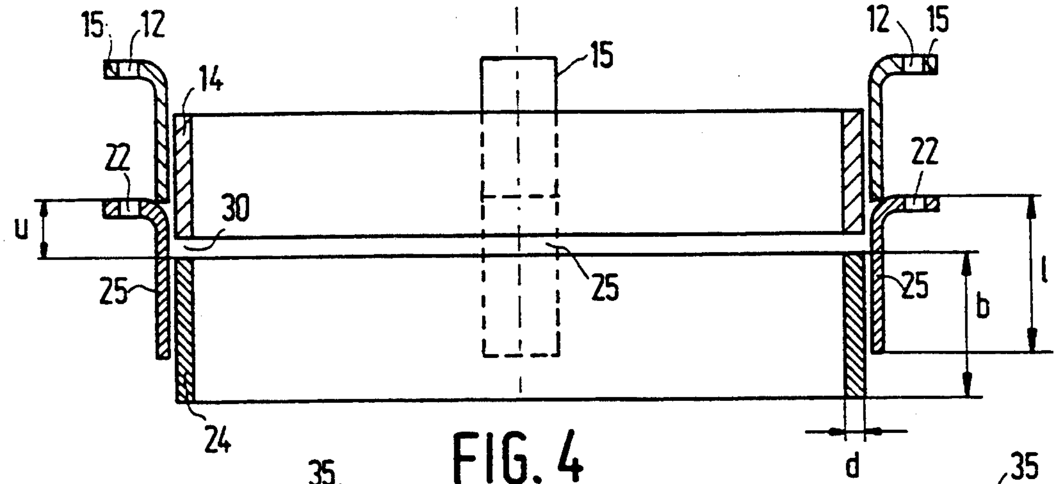
FIG. 4 is a diagrammatic sectional view of a third embodiment of an assembly according to the invention.
Figure 6:
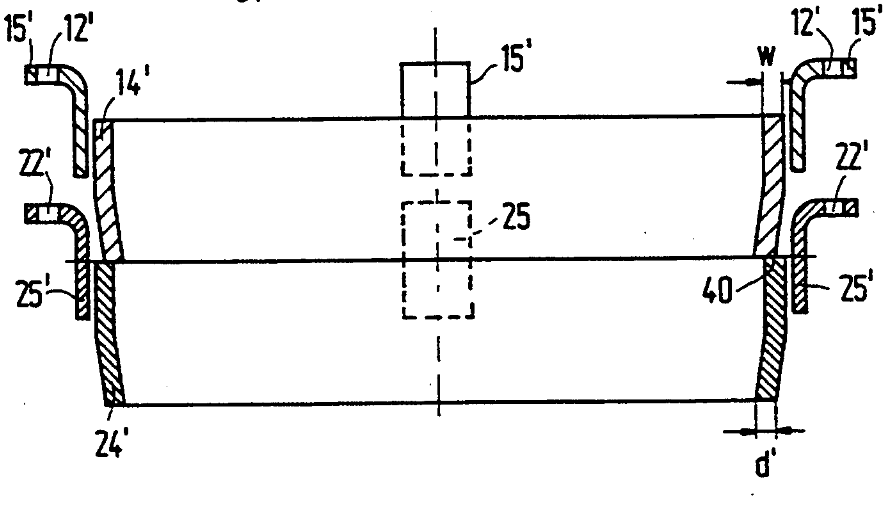
FIG. 6 is a diagrammatic sectional view of a further embodiment of an assembly according to the invention.
Figure 7A:
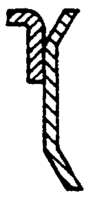
FIGS. 7*a*, 7*b* and 7*c* are diagrammatic cross-sectional views of profiled anti-implosion bands which can be used in the invention.
Figure 7B:
Figure 7C:

FIG. 1 is a perspective view of a display tube comprising an evacuated glass envelope including a substantially rectangular display window 1, a conical portion 2 and a neck portion 3. A substantially rectangular anti-implosion band 4 is provided around the display window 1, with the band substantially reducing the risk of implosion of the envelope as a result of external forces (for example when the display tube is dropped) or the risk of spontaneous implosion. In particular a metal band having a shape which is substantially equal to the shape of the outer annular surface of the display window 1, but with a slightly smaller circumference, is used for the anti-implosion band. The metal band is heated until its circumference is larger than that of the display window and, subsequently, it is provided around said display window. The band is then left to cool, as a result of which the band contracts and secures the display window under a mechanical stress. The metal band cross-section, as viewed along line I—I, may be "flat", i.e., rectangular, as shown in FIGS. 2–4, or profiled, as shown, for example, in FIGS. 6, 7*a*, *b* and *c*.

To suspend the display tube in a cabinet, the anti-implosion band 4 is provided with suspension elements 5 which can be connected to cooperating elements in the cabinet. An anti-implosion band according to the invention, which is provided with such suspension elements, will be described in more detail with reference to the remaining figures.

In general, anti-implosion bands and envelopes of display tubes are manufactured separately. Before the anti-implosion bands are provided on the envelopes, they often have to be stored and/or transported. The storage and/or transport can be carried out in a simple manner by stacking the anti-implosion bands in cooperation with the suspension elements to form an assembly according to the invention.

Figure 2:
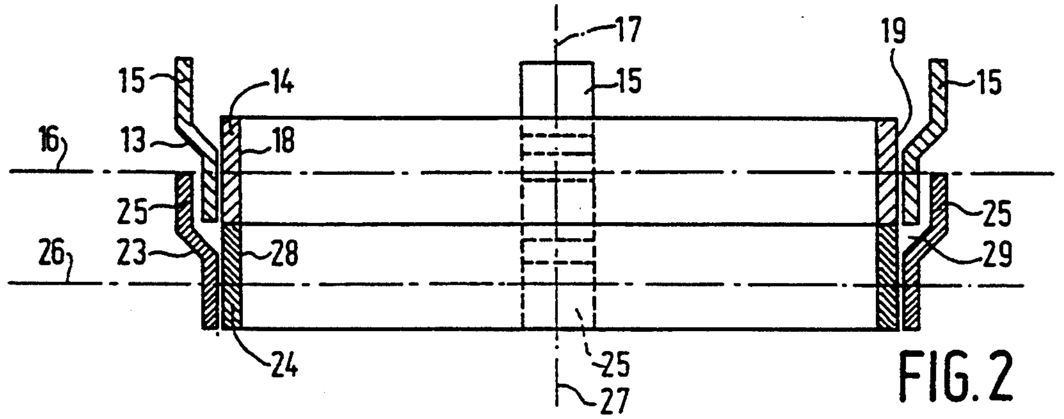
FIG. 2 is a diagrammatic sectional view of a first embodiment of an assembly of two anti-implosion bands according to the invention.

FIG. 2 is a diagrammatic sectional view of an assembly of two substantially identical anti-implosion bands 14, 24 which each comprise a number of suspension elements 15, 25. It will be obvious that the assembly may comprise more than two anti-implosion bands and that the invention is not limited to the example described herein. Each anti-implosion band 14, 24 is substantially rectangular and defines a plane 16, 26 and a central axis 17, 27 transverse thereto. In the substantially rectangular assembly, the central axes 17 and 27 substantially coincide. The anti-implosion bands 14, 24 each have an inner surface 18, 28 and an outer surface 19, 29, which surfaces extend parallel to the central axes 17, 27. The suspension elements 15, 25 are secured to the anti-implosion bands 14, 24 at the location of the outer surfaces 19, 29. The suspension elements 15, 25 each project from one edge of the relevant anti-implosion band 14, 24 in a direction parallel to the central axes 17, 27. In this preferred embodiment, all suspension elements of one anti-implosion band project in the same direction. As a result hereof, the suspension elements 25 of the anti-implosion band 24 surround the outer surface 19 of the anti-implosion band 14. To preclude the anti-implosion band 14 from becoming jammed between the suspension elements 25, the elements 25 must surround the band 14 with clearance. This can be attained, for example, by providing each suspension element 15, 25 with a sufficiently large bend 13, 23.

The mutual positions of the anti-implosion bands 14, 24 in the assembly remain substantially equal, for example during transport of the assembly, primarily because the suspension elements 25 limit the movement of the band 14 in a direction transverse to the central axes 17, 27. For this purpose, the suspension elements project from the anti-implosion band, preferably, over a distance of at least 20% of the width of the band. Consequently, deformations of the anti-implosion bands caused by the bands being jammed during transport substantially no longer occur. In addition, the removal of an anti-implosion band from the assembly can be carried out in a simple manner because the anti-implosion bands in the assembly are stacked loosely relative to each other. Moreover, the anti-implosion bands in the assembly are of a relatively small volume because the suspension elements of the one anti-implosion band partly overlap the other anti-implosion band.

FIG. 3 is a diagrammatic view of an alternative embodiment of an assembly of two anti-implosion bands 14, 24 according to the invention, in which the suspension elements 15, 15', 25, 25' are L-shaped The suspension elements 15, 25 and 15', 25' are provided with apertures 12, 22 for suspending the display tube in a cabinet. In this embodiment, the width b of an anti-implosion band 24 is larger than the length 1 of the part of the suspension element 25 which extends substantially parallel to the central axis of the anti-implosion band 24 (b>1). For example, the length 1 of the part of the suspension element is 10 mm, the width b of the anti-implosion band is 20 mm and the thickness d of the band is 1.2 mm. The distance u over which the suspension element projects from the band is, for example, 3 mm. In the present example the corner 29 of each suspension element of the anti-implosion band 24 is rounded to ensure that the other anti-implosion band 14 of the assembly can be arranged between the suspension elements in a simple manner.

In accordance with another preferred embodiment, the width b of the anti-implosion band 24 is smaller than the length 1 of the part of the suspension element 25 which extends parallel to the central axis (b<1), as shown in the diagrammatic sectional view of FIG. 4. By virtue of this construction a gap 30 is maintained between the two anti-implosion bands 14 and 24, so that the anti-implosion bands 14, 24 do not lie against each other. This is particularly advantageous with anti-implosion bands comprising, for example, an anti-reflection coating. Since the anti-implosion bands do not lie against each other, this coating remains substantially undamaged. For example, the length 1 of the part of the suspension element is 21 mm, the width b of the anti-implosion band is 20 mm and the distance u is 3 mm, so that the space between the two anti-implosion bands is 1 mm.

Figure 5:
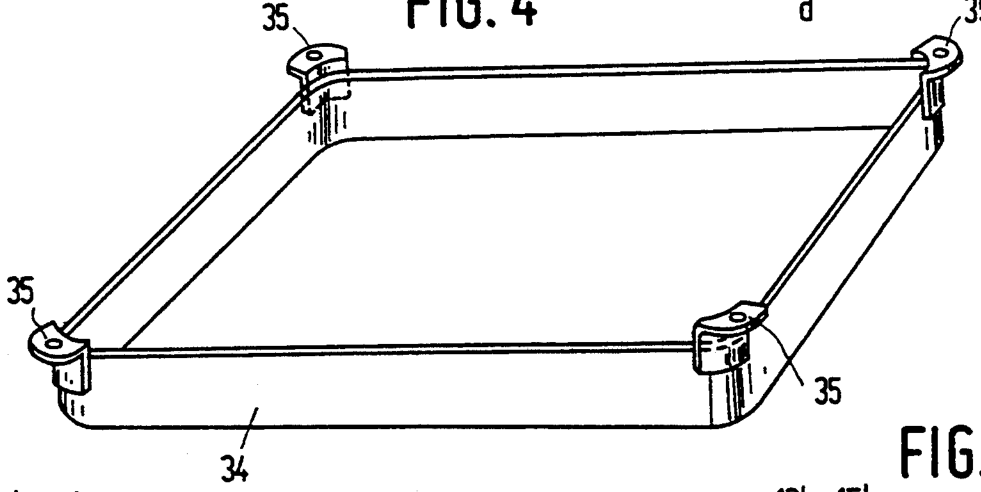
FIG. 5 is a diagrammatic perspective view of an embodiment of an anti-implosion band according to the invention.

The suspension elements may be provided, for example, in the centers of the sides of the anti-implosion band, but advantageously they are secured to the corners of the anti-implosion band 34, as shown in the diagrammatic perspective view of FIG. 5. When the suspension elements 35 are secured to the corners of the anti-implosion band 34, rotation of another anti-implosion band relative to the anti-implosion band 34 in an assembly is precluded to eliminate a clamping engagement of the bands.

In the above-described exemplary embodiments, the anti-implosion bands are manufactured from flat metal bands. However, the invention can be applied just as advantageously when anti-implosion bands manufactured from profiled metal bands are used, as diagrammatically shown in FIG. 6. The anti-implosion bands 14' and 24' are provided with a profile in the form of a bend and have a uniform thickness d'. To obtain a stable assembly, the profile in the form of a bend is such that the width W of the contact surface 40 between the two anti-implosion bands 14' and 24' is at least equal to half the thickness of the band d'. When the contact surface 40 is smaller there is a risk that during stacking the anti-implosion band 14' is arranged obliquely with respect to, or nested in the anti-implosion band 24', which could lead to an undesirable engagement Other embodiments of profiled metal bands which can be used in the framework of the invention are shown in the diagrammatic and cross-sectional views of FIGS. *7a*, *7b* and *7c*. In FIG. *7a* and FIG. *7b* suspension elements are shown.

By way of example, the invention is described in terms of a display tube having a glass, conical enveloping part. It will be obvious to those skilled in the art that the invention is not limited thereto, but also applies to a display tube having a box-shaped envelope which may be manufactured from glass or metal. In addition the suspension elements may be of many different types as long as the projecting parts of the suspension elements of an anti-implosion band in an assembly with another anti-implosion band surround the latter with clearance.

We claim:

1. An anti-implosion band for a display tube comprising:

(a) a closed rectangular band extending about a central axis, said closed rectangular band having inner and outer surfaces and having top and bottom edges; and (b) suspension elements disposed on only portions of said outer surface of said rectangular band, said suspension elements having at least one first part projecting parallel to said outer surface of said rectangular band and a second part projecting away from said rectangular band, wherein at least a portion of said suspension elements project beyond the top edge of said rectangular band, and wherein each of said suspension elements includes two of said first parts and said second part is disposed between said two first parts.

2. An anti-implosion band according to claim 1, wherein one of said two first parts of each of said suspension elements is secured to said outer surface of said rectangular band.

3. An anti-implosion band according to claim 1, wherein said rectangular band is a flat metal band.

4. An anti-implosion band according to claim 1, wherein said rectangular band is a profiled metal band.

5. A display tube comprising an anti-implosion band as claimed in claim 1.

6. An anti-implosion band according to claim 2, wherein said second part projects over a distance of at least 20% of a width of said rectangular band.

7. An anti-implosion band according to claim 1, wherein said suspension elements are L-shaped having said first part larger than a width of said rectangular band and said first part secured to said outer surface of said rectangular band.

8. A stackable assembly of anti-implosion bands for display tubes comprising:

(a) a plurality of anti-implosion bands, each of said anti-implosion bands including (i) a closed rectangular band extending about a central axis and having inner and outer surfaces, and (ii) suspension elements at only portions of said outer surface of said rectangular band, said suspension elements having at least one first part projecting parallel to said outer surface of said rectangular band and a second part projecting away from said rectangular band; and (b) said outer surface of each rectangular band being loosely surrounded and overlapped by said projecting parts of said suspension elements of an adjacent rectangular band.

9. A stackable assembly according to claim 8, wherein each of said suspension elements include two of said first parts and said second part is disposed between said two first parts.

10. A stackable assembly according to claim 9, wherein one of said two first parts of each of said suspension elements is secured to said outer surface of said rectangular band.

11. A stackable assembly according to claim 8, wherein said suspension elements are L-shaped having said first part smaller than a width of said rectangular band and said first part secured to said outer surface of said rectangular band.

12. A stackable assembly according to claim 8, wherein said suspension elements are L-shaped having said first part larger than a width of said rectangular band and said first part secured to said outer surface of said rectangular band.

13. A stackable assembly according to claim 8, wherein said rectangular band is a flat metal band.

14. A stackable assembly according to claim 8, wherein said rectangular band is a profiled metal band.

15. A display tube comprising an anti-implosion band as claimed in claim 8.

16. A stackable assembly according to claim 10, wherein said second part projects over a distance of at least 20% of a width of said rectangular band.

17. A stackable assembly according to claim 12, wherein a separation along said central axis exists between each rectangular band.

18. A stackable assembly according to claim 14, wherein each said profiled rectangular band has an end surface between said inner and outer surfaces, said end surface contacting a surface of an adjacent profiled band at least equal to half the thickness of said rectangular band.

19. An assembly of stackable anti-implosion bands for display tubes comprising (a) a plurality of anti-implosion bands, each of said anti-implosion bands being stacked on an adjacent one of said plurality; and (b) structural means on each anti-implosion band for maintaining said adjacent one in stacked relationship.

20. An assembly according to claim 19, wherein said structural means include a plurality of elements at outer portions of each of said anti-implosion bands, said elements extending beyond ends of each of said anti-implosion bands and encompassing said adjacent one of said plurality.

21. An assembly according to claim 20, wherein each of said plurality of elements includes two first parts extending parallel to an outer surface of said anti-implosion bands, said two first parts being axially and radially offset from one another, and a single second part extending angularly between said two first parts, one of said two first parts being attached to said outer surface.

22. An assembly according to claim 20, wherein each of said plurality of elements includes first parts attached to an outer surface of said anti-implosion bands, said first parts extending parallel to said outer surface and encompassing said adjacent one of said plurality, and second parts at an end of said first parts which encompass said adjacent one of said plurality, said second parts extending radially away from said first parts.

23. An assembly according to claim 22, wherein said first parts are of a length great enough to separate each of said anti-implosion bands from said adjacent one of said plurality.

24. An assembly according to claim 22, wherein each of said anti-implosion bands curves radially inwardly at a second end of said first parts.

* * * * *